US012748055B2

(12) United States Patent
Yang et al.

(10) Patent No.: US 12,748,055 B2
(45) Date of Patent: Sep. 29, 2026

(54) AEROSOL SENSOR AND AN INTEGRATED OPTICAL COMPONENT THEREOF

(71) Applicant: Honeywell International Inc., Charlotte, NC (US)

(72) Inventors: Fan Yang, Charlotte, NC (US); Yu Hu, Charlotte, NC (US); Yongbing Zhu, Charlotte, NC (US); Bo Zhang, Charlotte, NC (US); Jianbiao Zhang, Charlotte, NC (US); Kai Liu, Charlotte, NC (US)

(73) Assignee: Honeywell International Inc., Charlotte, NC (US)

( * ) Notice: Subject to any disclaimer, the term of this patent is extended or adjusted under 35 U.S.C. 154(b) by 160 days.

(21) Appl. No.: 18/455,212

(22) Filed: Aug. 24, 2023

(65) Prior Publication Data

US 2024/0068954 A1 Feb. 29, 2024

(30) Foreign Application Priority Data

Aug. 30, 2022 (CN) ......................... 202211052596.0

(51) Int. Cl.
*G01N 21/94* (2006.01)
*G01N 15/0205* (2024.01)
(Continued)

(52) U.S. Cl.
CPC ......... *G01N 21/94* (2013.01); *G01N 15/0211* (2013.01); *G01N 15/075* (2024.01);
(Continued)

(58) Field of Classification Search
CPC ............... G01N 21/94; G01N 21/1702; G01N 2021/1704; G01N 2201/0216;
(Continued)

(56) References Cited

U.S. PATENT DOCUMENTS 2,364,670 A * 12/1944 Stamy .................... G02B 23/08 359/833
5,383,024 A 1/1995 Maxey et al.
(Continued)

FOREIGN PATENT DOCUMENTS

CN 110989141 A * 4/2020 ............ G02B 13/00
EP 3214425 A1 9/2017

OTHER PUBLICATIONS

Festo, "Optoelectronic sensors", retrieved from the Internet at URL: <https://www.festo.com/media/pim/734/D15000100143734.PDF> on Jan. 29, 2024, 58 pages.
(Continued)

*Primary Examiner* — Georgia Y Epps
*Assistant Examiner* — Erin R Garber
(74) *Attorney, Agent, or Firm* — Alston & Bird LLP

(57) ABSTRACT

An integrated optical component coupled to a circuit board of an aerosol sensor is provided. The integrated optical component comprising a medium including a first, second plane, third plane, wherein the first plane is adjacent to a detection area, the second plane is positioned about a photosensor, and the third plane is opposite an angle formed by an intersection of the first and second plane. The integrated optical component further comprising a first lens configured on the first sidewall, the first lens configured to receive incident light from the detection area and focus the incident light onto a reflector through the medium, the reflector configured on the third sidewall, the reflector configured to reflect the incident light towards a second lens, and the second lens configured on the second sidewall, the second lens configured to receive the incident light from the reflector and focus the incident light to the photosensor.

18 Claims, 7 Drawing Sheets

(51) Int. Cl.

| | |
|---|---|
| ***G01N 15/075*** | (2024.01) |
| ***G01N 21/17*** | (2006.01) |
| *G01N 15/00* | (2024.01) |
| *G01N 21/47* | (2006.01) |
| *G01N 21/53* | (2006.01) |

(52) U.S. Cl.
CPC . *G01N 21/1702* (2013.01); *G01N 2015/0046* (2013.01); *G01N 2021/1704* (2013.01); *G01N 2021/4726* (2013.01); *G01N 21/53* (2013.01); *G01N 2201/0216* (2013.01); *G01N 2201/0612* (2013.01); *G01N 2201/062* (2013.01); *G01N 2201/068* (2013.01); *G01N 2201/124* (2013.01)

(58) Field of Classification Search
CPC ..... G01N 2201/0612; G01N 2201/062; G01N 2201/068; G01N 2201/124; G01N 21/53; G01N 2021/4726; G01N 15/075; G01N 15/0211; G01N 2015/0046; G01N 21/49; G01N 21/01; G01N 2021/0112; G01N 21/3504; G01N 2201/061; G01N 21/88; G01N 15/0205; G01N 15/1434; G01N 2001/2223; G01N 2015/1486; G01N 2015/1493; G01N 2015/1497; G01N 2201/0214
See application file for complete search history.

(56) References Cited

U.S. PATENT DOCUMENTS

| | | | | |
|---|---|---|---|---|
| 5,646,597 | A | 7/1997 | Hamburger et al. | |
| 7,576,844 | B2 | 8/2009 | Hairston et al. | |
| 9,574,988 | B2 | 2/2017 | Donner | |
| 11,442,205 | B2 * | 9/2022 | Shigemitsu | G02B 7/1805 |
| 2006/0044558 | A1 | 3/2006 | Furukawa | |
| 2010/0165341 | A1 | 7/2010 | Babico et al. | |
| 2015/0241989 | A1 * | 8/2015 | Heng | G06F 3/0304 250/221 |
| 2021/0208062 | A1 * | 7/2021 | Linden | G01N 21/3504 |
| 2021/0255099 | A1 * | 8/2021 | Ohyama | G01S 17/95 |
| 2022/0050041 | A1 * | 2/2022 | Schreiber | G01N 15/06 |
| 2022/0104691 | A1 * | 4/2022 | Sato | G02B 5/282 |
| 2023/0204503 | A1 * | 6/2023 | Priwisch | G01R 31/311 |
| 2025/0136922 | A1 * | 5/2025 | Russell | C12M 47/02 |

OTHER PUBLICATIONS

Festo, "Retro-reflective sensor", SOOD-RS-R-PN, retrieved from the Internet at URL: <https://www.festo.com/lt/en/a/8075657/ 2 pages retrieved Jun. 2, 2026.

Extended European Search Report Mailed on Feb. 20, 2024 for EP Application No. 23190808, 10 page(s).

* cited by examiner

AEROSOL SENSOR AND AN INTEGRATED OPTICAL COMPONENT THEREOF

CROSS-REFERENCE TO RELATED APPLICATIONS

This application claims priority pursuant to 35 U.S.C. 119(a) to Chinese Application No. 202211052596.0, filed Aug. 30, 2022, which application is incorporated herein by reference in its entirety.

FIELD OF THE INVENTION

Example embodiments of the present disclosure relate generally to aerosol sensors, and in particular, an integrated optical component comprising a reflector and lens housing.

BACKGROUND

Thermal runaway is one of the primary risks related to using batteries in electrical vehicles. Thermal runaway may occur when an internal short circuit is created in a battery that is caused by physical damage, overheating, overcharging, or poor maintenance. The short circuit may cause a chain reaction within one or more cells in the battery which causes excessive heat and release of toxic gases. An aerosol sensor may be used to detect potential thermal runaway by detecting aerosols (e.g., smoke, liquid droplets) generated from a battery. However, Applicant has identified technical challenges and difficulties with traditional aerosol sensors, making them unsuitable for vehicle batteries.

BRIEF SUMMARY

Various embodiments described herein relate to components, apparatuses, and systems for detecting aerosols.

In accordance with various embodiments of the present disclosure, an integrated optical component coupled to a circuit board of an aerosol sensor is provided. In some embodiments, the integrated optical component comprises a medium including a first plane, a second plane, and a third plane, wherein the first plane is adjacent to a detection area, the second plane is positioned about a photosensor, and the third plane is opposite an angle formed by an intersection of the first plane and the second plane. The integrated optical component may further comprise a first lens configured on the first plane, the first lens configured to receive incident light from the detection area and focus the incident light onto a reflector through the medium, the reflector configured on the third plane, the reflector configured to reflect the incident light towards a second lens, and the second lens configured on the second plane, the second lens configured to receive the incident light from the reflector and focus the incident light to the photosensor.

In some embodiments, the first lens and the second lens may each comprise light transmissive material including two opposing curved surfaces. In some embodiments, the reflector may comprise a mirror or reflective surface. In some embodiments, the angle may be greater than 90° and up to 135°. In some embodiments, the angle may be 90°. In some embodiments, the angle may be less than 90°.

According to another embodiment, an aerosol sensing system is provided. In some embodiments, the aerosol sensing system comprises a detection area comprising a sampling space, a light source configured to project light to the detection area, an integrated optical component configured to receive incident light from the detection area based at least in part on the light projected by the light source, and direct the incident light to a photosensor, the photosensor configured to receive the incident light from the integrated optical component, and convert the received incident light into an electric signal.

In some embodiments, the electric signal may be representative of characteristics of the incident light. In some embodiments, the electric signal may be usable by a processor of a computing device or a circuit to detect aerosols in the detection area based at least in part on the incident light. In some embodiments, the light source may comprise a semiconductor light emitter. In some embodiments, the semiconductor light emitter may comprise at least one of: a light emitting diode, or a semiconductor laser diode. In some embodiments, the photosensor may comprise an optical sensitive device. In some embodiments, the optical sensitive device may comprise at least one of: a photodiode, a photo integrated circuit diode, a photo transistor, a photomultiplier tube, or a phototriode. In some embodiments, the photosensor may be further configured to generate electric signals associated with a number of particles, particle size, and particle concentration. In some embodiments, the integrated optical component may comprise a reflector and at least a pair of lenses. In some embodiments, the integrated optical component may comprise a first lens facing the detection area, the first lens configured to receive the incident light from the detection area, and focus the incident light onto a reflector. In some embodiments, the integrated optical component may comprise a reflector, the reflector configured to reflect the focused incident light to a second lens. In some embodiments, the integrated optical component may comprise the second lens positioned about the photosensor, the second lens configured to receive the incident light from the reflector, and focus the incident light to the photosensor. In some embodiments, the integrated optical component may comprise a housing, and a plurality of apertures on given sidewalls of the housing.

According to another embodiment, an aerosol sensor is provided. In some embodiments, the aerosol sensor comprises a circuit board configured to generate aerosol detection signals based at least in part on electric signals generated a photosensor, an integrated optical component coupled to the circuit board via a holder, the integrated optical component comprising an input sidewall and an output sidewall, the holder comprising a fixture positioning the integrated optical component in a stationary position relative to a light source and a photosensor, the light source coupled to the circuit board and interfacing with the input sidewall of the integrated optical component, the light source configured to project light to at least a portion of the holder and cause incident light associated with the projected light to be received into the integrated optical component at the input sidewall, the photosensor coupled to the circuit board and interfacing with the output sidewall of the integrated optical component, the photosensor configured to receive the incident light from the integrated optical component via the output sidewall and convert the incident light into the electric signals.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
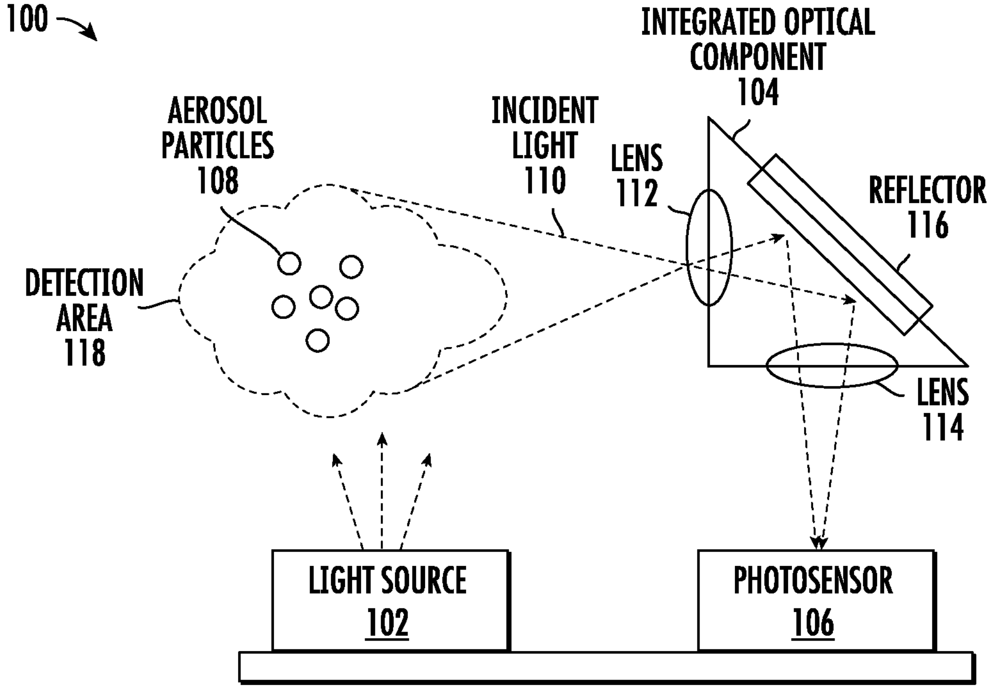
FIG. 1 illustrates an exemplary aerosol sensing system in accordance with some example embodiments described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements Like numbers refer to like elements throughout.

As used herein, terms such as "front," "rear," "top," etc. are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

An aerosol sensor may be useful in applications where detecting aerosols is desired. Such an application may be in a battery package of an electric vehicle where the presence of aerosols, such as smoke, liquid droplets, and other particles may indicate thermal runaway.

As described above, there are many technical challenges and difficulties associated with current aerosol sensors. Conventional aerosol sensors are not designed to withstand shock or vibrations and temperature variations that may be associated with moving vehicle applications. That is, convention aerosol sensors are prone to component misalignment or even damage in the presence of such stresses, which may affect and hinder detection accuracy. There is thus a need to overcome such challenges and difficulties in designing aerosol sensors and components that can be used for electric vehicle batteries.

Aerosol sensors may comprise devices including a light source and a photosensor. The light source may emit light into a detection area where light scattering in the presence of aerosols may be detected using the photosensor.

Referring now to FIG. 1, an exemplary aerosol sensing system according to one embodiment is depicted. Aerosol sensing system 100 comprises light source 102, integrated optical component 104, and photosensor 106. As depicted, light source 102 is operable to project light to a detection area 118. Light source 102 may comprise a semiconductor light emitter such as a light emitting diode (LED), or a semiconductor laser diode. The light source 102 may be configured to emit light of a predetermined wavelength, including infrared, red, green, blue, and ultraviolet light.

Detection area 118 may comprise an aperture, channel, or opening for sampling air from a surrounding environment. The presence of aerosol particles in detection area 118 may scatter or deflect light projected by light source 102. As such, the scattered light may indicate the presence of aerosols. Incident light 110 from detection area 118 may be received into a medium of integrated optical component 104 and directed to photosensor 106. The medium may comprise a light transmissive material, such as glass, or plastic (e.g., PMMA, or polycarbonate). In some embodiments, the medium may comprise an air cavity. The incident light 110 may comprise at least a portion of light projected by light source 102 into detection area 118 including any scattering of light upon presence of aerosol particles 108, and thus capturing aerosol presence.

A photosensor, as described herewith, may comprise an optical sensitive device, such as a photodiode, a photo integrated circuit diode, a phototransistor, a photomultiplier tube, or a phototriode. Photosensor 106 may be configured to receive incident light 110 from the integrated optical component 104 and convert the received incident light 110 into an electric signal. As such, the electric signal may be representative of characteristics of the incident light 110. According to various embodiments of the present disclosure, the photosensor 106 may generate electric signals that can be used (e.g., by a processor of a computing device or a circuit) to detect aerosols in the detection area 118 based at least in part on scattering of incident light 110. Particularly, electric signals from photosensor 106 may be used to detect the presence or absence of aerosols in an environment indicative of an abnormal condition (e.g., thermal runaway). Photosensor 106 may further generate electric signals associated with the number of particles, particle size, and particle concentration.

The integrated optical component 104 may be used to sample the incident light 110 from the detection area 118 and focus the sampled incident light 110 to the photosensor 106. Integrated optical component 104 comprises lens 112, lens 114, a reflector 116. A lens, as described herewith, may comprise a light transmissive material such as glass, or plastic (e.g., PMMA, or polycarbonate) including two opposing curved surfaces for concentrating or dispersing light rays. A lens may include a round or oval shape. Lens 112 is disposed on a plane of integrated optical component 104 facing the detection area 118 to receive the incident light 110. Incident light 110 may be focused into the medium of integrated optical component 104 and onto reflector 116 via lens 112.

A reflector, as described herewith, may comprise a mirror or reflective surface such that light incident on the reflector can be guided towards a given target, e.g., a photosensor 106. Reflectors may include, for example, metal, or reflective film formed on a surface (e.g., plastic or glass). Examples of metals or reflective film include, aluminum, gold, silver, copper, specular film, or a dielectric multilayer film. Reflector 116 may comprise a mirror or reflective surface capable of reflecting, guiding, or redirecting incident light 110 focused by lens 112 towards lens 114. Lens 114 is disposed on a plane of integrated optical component 104 facing photosensor 106. Lens 114 may focus the incident light 110 reflected from reflector 116 towards photosensor 106. As such, photosensor 106 can sample the incident light 110 from the detection area 118 for analysis.

Figure 2A:
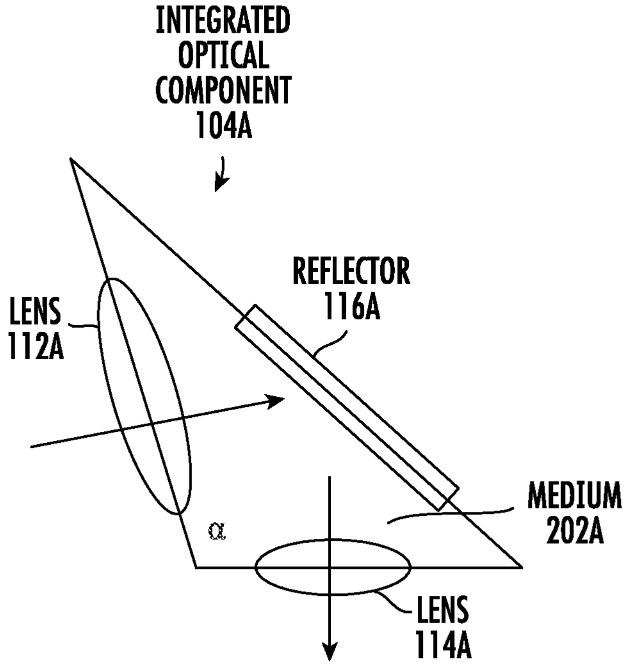
FIG. 2A illustrates exemplary elements of an integrated optical component in accordance with some embodiments of the present disclosure.

FIG. 2A presents exemplary elements of an integrated optical component in accordance with some embodiments of the present disclosure. Integrated optical component 104A comprises lens 112A, lens 114A, reflector 116A, and medium 202A. In some embodiments, medium 202A may comprise a solid core of light transmissive material. Each of lens 112A, lens 114A, and reflector 116A are configured on planes of medium 202A. The planes may comprise a setting that configures lens 112A, lens 114A, and reflector 116A into a triangular formation. Lens 112A may comprise a lens that is configured on a plane that faces detection area 118. Reflector 116A is configured on a plane opposing angle α formed at an intersection of the planes of lens 112A and lens 114A.

Figure 2B:
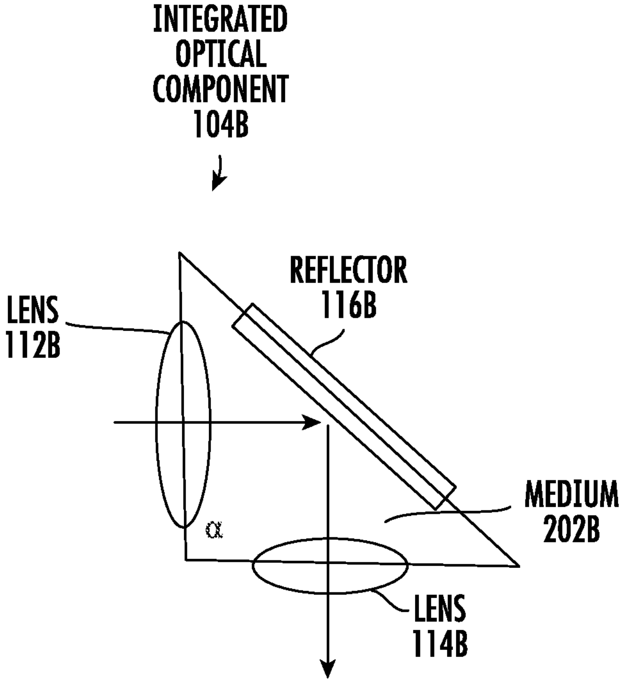
FIG. 2B illustrates exemplary elements of an integrated optical component in accordance with some embodiments of the present disclosure.

An angle α between respective planes of lens 112A and lens 114A may be any suitable angle such that lens 112A is capable of receiving incident light 110 from detection area 118 and focusing the incident light 110 through medium 202A and onto reflector 116A such that the incident light 110 may be received by lens 114A. As depicted in FIG. 2A, an angle α between lens 112A and lens 114A is obtuse (e.g., greater than 90°, up to 135°). However, according to other embodiments of the present disclosure, angle α may be a right angle (i.e., 90°), as illustrated in FIG. 2B, or an acute angle (i.e., less than 90°). The positioning of reflector 116A and lens 114A along their respective planes may vary depending on angle α. That is, angle α may affect a direction of incident light 110 focused by lens 112A such that reflector 116A and lens 114A may need to be positioned accordingly to align with focusing of the incident light 110 by lens 112A.

FIG. 2B presents exemplary elements of an integrated optical component in accordance with some embodiments of the present disclosure. Integrated optical component 104B comprises lens 112B, lens 114AB, reflector 116B, and medium 202B. In some embodiments, medium 202B may comprise a solid core of light transmissive material. Each of lens 112B, lens 114B, and reflector 116B are configured on planes of the medium 202B. The planes may comprise a setting that configures lens 112B, lens 114B, and reflector 116B into a triangular formation. Lens 112B may comprise a lens that is configured on a plane that faces detection area 118. Reflector 116B is configured on a plane opposing angle α formed at an intersection of the planes of lens 112B and 114B.

An angle α between respective planes of lens 112B and lens 114B is 90°. Lens 112B is capable of receiving incident light 110 from detection area 118 and focusing the incident light 110 through medium 202B and onto reflector 116B such that the incident light 110 may be received by lens 114B. It is noted that the positioning of reflector 116B in integrated optical component 104B may differ from the positioning of reflector 116A in integrated optical component 104A relative to the lenses. That is, angle α may affect a direction of incident light 110 focused by lens 112A and 112B. Similarly, the positioning of lens 114B may differ from the positioning of lens 114A due to a difference in angle α between integrated optical component 104B and integrated optical component 104A.

Figure 3:
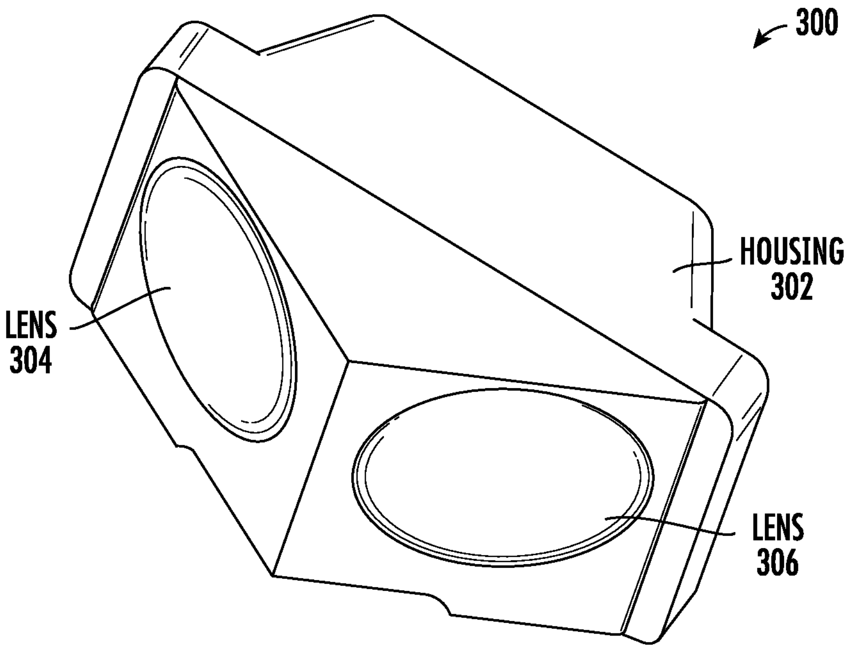
FIG. 3 and FIG. 4 illustrate views of an exemplary integrated optical component in accordance with various embodiments of the present disclosure.
Figure 4:
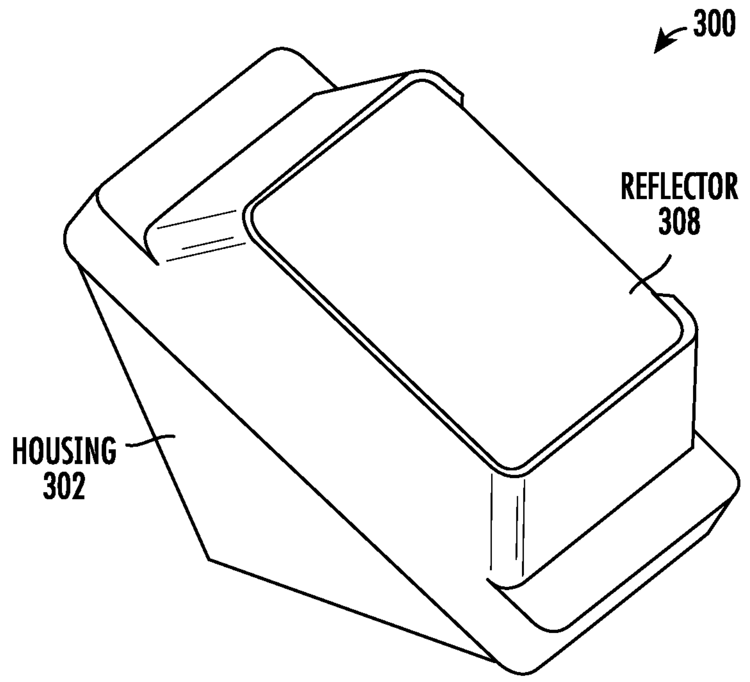

FIG. 3 and FIG. 4 present views of an exemplary integrated optical component in accordance with various embodiments of the present disclosure. The integrated optical component 300 comprises a housing 302 that may be constructed from, for example, glass, plastics, resins, or other synthetic polymers, such as acrylic or polymethyl methacrylate (PMMA). The integrated optical component 300 further comprises lens 304, lens 306, and reflector 308, each configured on a given sidewall of the housing 302 such that the planes of lens 304, lens 306, and reflector 308 form a triangular shape. Lens 304 and lens 306 may be affixed within an aperture or opening on their respective sidewalls of housing 302. Reflector 308 may be configured within an aperture or opening on the sidewall opposed to an angle formed at an intersection of a sidewall configured with lens 304 and a sidewall configured with lens 306. According to various embodiments of the present disclosure, the housing 302 may comprise a solid body of light transmissive material such that light may be transmitted between lens 304, lens 306, and reflector 308 through housing 302.

Figure 5:
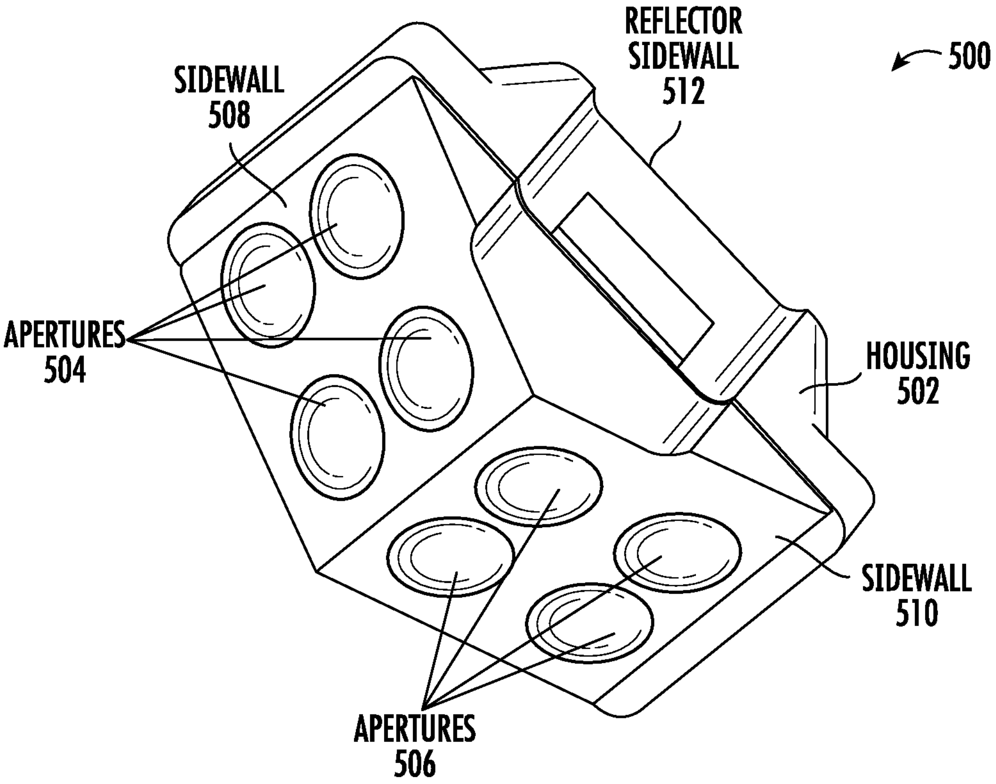
FIG. 5 illustrates an integrated optical component in accordance with various embodiments of the present disclosure.

In some embodiments, an integrated optical component may comprise a plurality of apertures on given sidewalls of the integrated optical component's housing. As depicted in FIG. 5, an integrated optical component 500 comprises a housing 502. Housing 502 includes apertures 504 on sidewall 508 and apertures 506 on sidewall 510. The planes of sidewall 508 and sidewall 510 may form an angle opposed to reflector sidewall 512. Reflector sidewall 512 may comprise a sideway including a reflector for reflecting incident light, e.g., from apertures 504 to apertures 506. In some embodiments, one or more of apertures 504 and one or more of apertures 506 may be configured with a lens. Lenses may be placed in any one of or in a specific one of apertures 504 and apertures 506. For example, apertures 504 and apertures 506 may be used to provide specific lens configurations to achieve given incident light input and output properties with respect to the integrated optical component 500. That is, lenses, as used with integrated optical component 500, may control light refraction or diffraction in concert with a reflector. In certain embodiments, integrated optical component 500 may be used without any lens placed in one or more, or any of apertures 504 and apertures 506. As such, lenses may be added or removed from apertures 504 and apertures 506 due to different applications.

Figure 6:
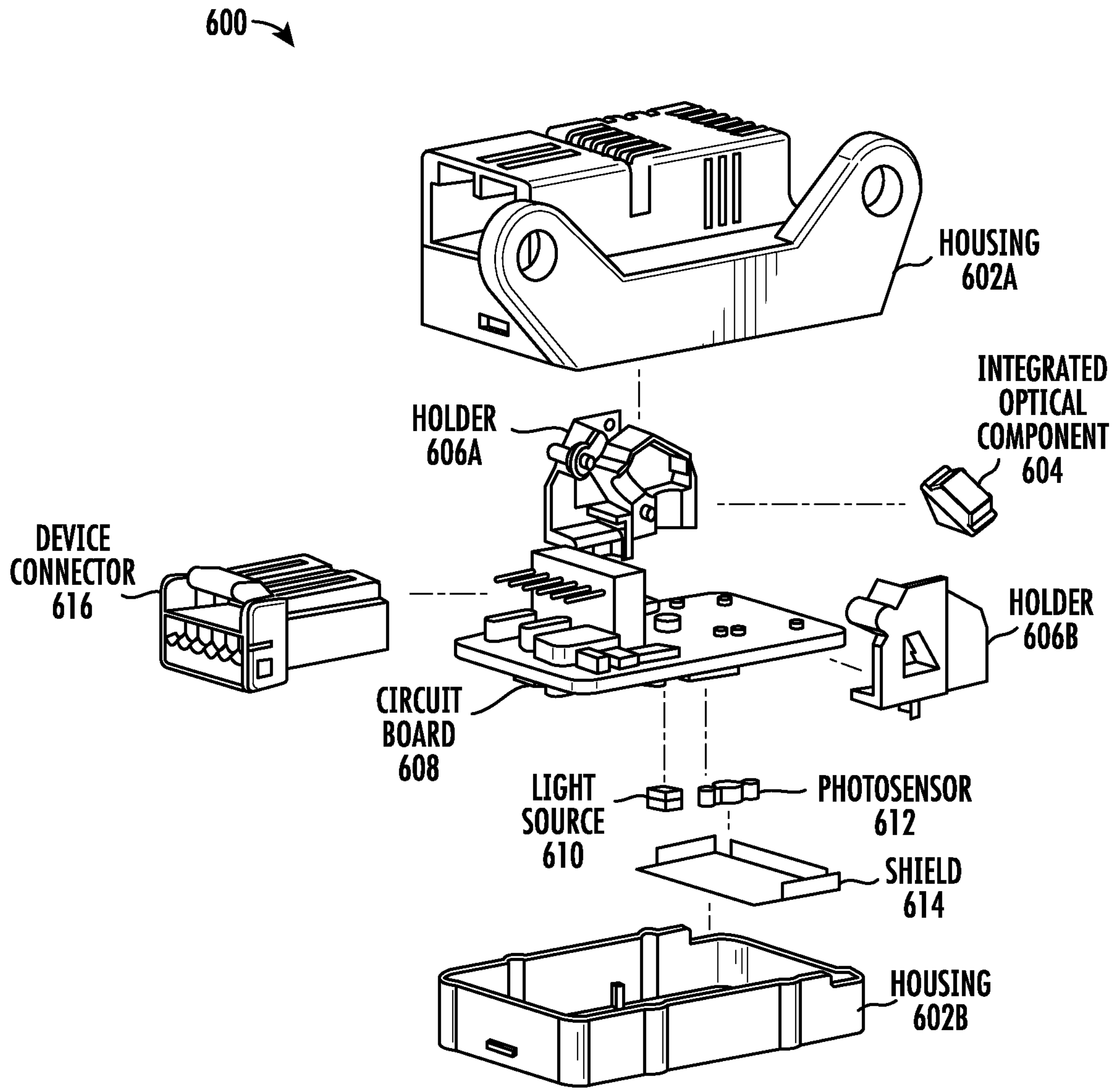
FIG. 6 illustrates an exploded view of an exemplary aerosol sensor in accordance with various embodiments of the present disclosure.

FIG. 6 presents an exploded view of an exemplary aerosol sensor according to one embodiment of the present disclosure. Aerosol sensor 600 comprises housing 602A, housing 602B, integrated optical component 604, holder 606A, holder 606B, circuit board 608, light source 610, photosensor 612, and shield 614. Housing 602A and housing 602B may comprise two halves of a clam-shell structure that encapsulates and is capable of serving as a protective cover of integrated optical component 604, holder 606A, holder 606B, circuit board 608, light source 610, photosensor 612, and shield 614. Light source 610 and photosensor 612 are configured on circuit board 608. Shield 614 may provide a protective covering to prevent damage to light source 610, photosensor 612, and at least a portion of circuit board 608.

Circuit board 608 may control operation and functionality of light source 610 and photosensor 612 to provide aerosol detection. Integrated optical component 604 is coupled to circuit board 608 via holder 606A and 606B. In particular, integrated optical component 604 is held between holder 606A and 606B in a position suitable for receiving incident light from light source 610 and transmitting the incident light to photosensor 612. In some embodiments, holder 606A and holder 606B may comprise a fixture for firmly positioning integrated optical component 604 in a stationary position relative to light source 610 and photosensor 612.

Light source 610 is operable to project light to at least a portion of holder 606 (comprised of holder 606A and holder 606B) serving as a detection area. The light source 610 may comprise a semiconductor light emitter such as a light emitting diode (LED), or a semiconductor laser diode configured to emit light of a predetermined wavelength, including infrared, red, green, blue, and ultraviolet light.

Figure 7:
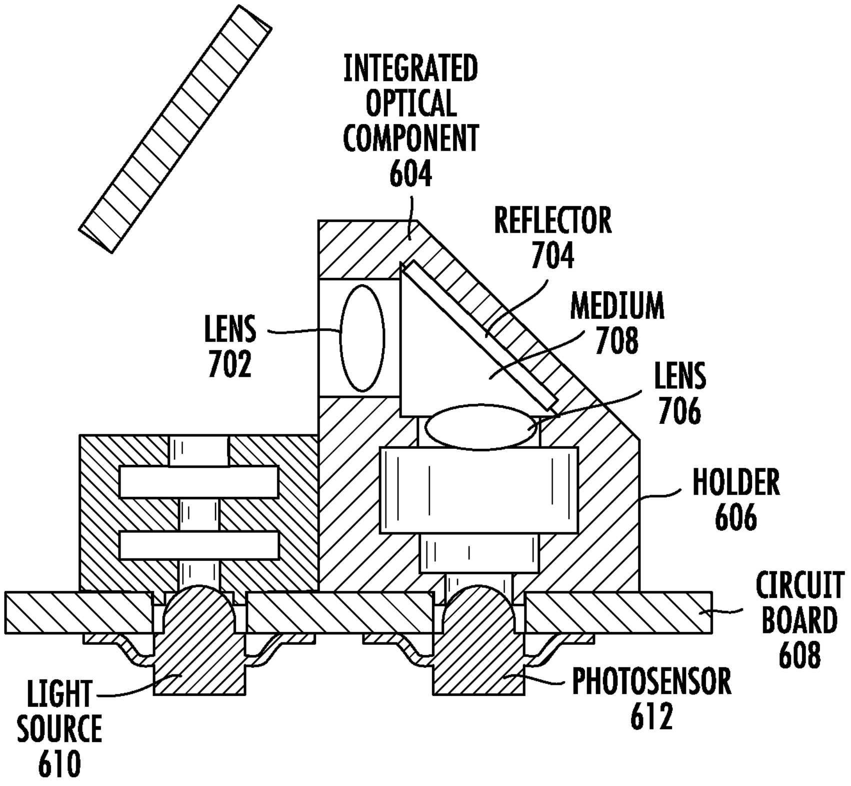
FIG. 7 illustrates a cross-sectional view of a portion of an exemplary aerosol sensor in accordance with various embodiments of the present disclosure.

FIG. 7 presents a cross-sectional view of a portion of an exemplary aerosol sensor according to one embodiment of the present disclosure. Integrated optical component 604 comprises a lens 702 at an input sidewall, an internal reflector 704, and a lens 706 at an output sidewall. The input sidewall of the integrated optical component 604 may interface with the detection area to receive light. The lens 702 at the input sidewall may be capable of focusing at least a portion of the light in the detection area into a medium of the integrated optical component 604. In particular, the lens 702 may focus light from the detection area onto the internal reflector 704. The internal reflector 704 may direct the focused light from the lens 702 to lens 706 at the output sidewall of integrated optical component 604. As described above, the medium may comprise light transmissive material, such as glass, or plastic (e.g., PMMA, or polycarbonate), or alternatively, in some embodiments, an air cavity.

The output sidewall may comprise a sidewall of the integrated optical component 604 configured to allow light to pass out of the integrated optical component 604. The photosensor 612 may be aligned with an output sidewall of the integrated optical component 604. Photosensor 612 may comprise an optical sensitive device configured to receive light from the integrated optical component 604. Light received from the integrated optical component 604 may be converted by the photosensor 612 into an electric signal. For example, the photosensor 612 may generate electric signals that can be transmitted to a processor on circuit board 608 to detect aerosols in the detection area. Particularly, electric signals from photosensor 612 may correspond to the presence (or absence) of light scattering which is indicative of aerosols in an environment. Photosensor 612 may further generate electric signals associated with the number of particles, particle size, and particle concentration.

Device connector 616 may comprise a connection interface configured to transfer data or signals from circuit board 608 to a computer or processing device. For example, the device connector 616 may be used to establish a signal connection with circuit board 608 to communicate aerosol detection signals to, for example, a system controller or system management device. The aerosol detection signals may be based at least in part on electric signals generated by photosensor 612. In some embodiments, the system controller or system management device may comprise a battery management system. As an example, the battery management system may be configured to monitor a battery, provide protection to the battery, optimize performance of the battery, and report operational status of the battery to external devices based at least in part on aerosol detection signals from the circuit board 608.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

What is claimed is:

1. An integrated optical component coupled to a circuit board of an aerosol sensor, the integrated optical component comprising:
- a medium including a first plane, a second plane, and a third plane, wherein:
  - the first plane is adjacent to a detection area;
  - the second plane is positioned about a photosensor; and
  - the third plane is opposite an angle formed by an intersection of the first plane and the second plane;
- a first lens configured on the first plane and disposed on a first sidewall of the integrated optical component, wherein the first lens is configured to receive incident light from the detection area and focus the incident light onto a reflector through the medium;
- the reflector configured on the third plane and disposed on a third sidewall of the integrated optical component, wherein the reflector is configured to reflect the incident light towards a second lens; and
- the second lens configured on the second plane and disposed on a second sidewall of the integrated optical component, wherein:
  - (i) the second lens is configured to receive the incident light from the reflector and focus the incident light to the photosensor, (ii) the integrated optical component is coupled to the circuit board via a holder, wherein the holder comprises a fixture that positions the integrated optical component in a stationary position relative to a light source and the photosensor,
  - (iii) the light source is configured to project light to at least a portion of the holder, and
  - (iv) the portion of the holder comprises the detection area.

2. The integrated optical component of claim 1, wherein the first lens and the second lens each comprise light transmissive material including two opposing curved surfaces.

3. The integrated optical component of claim 1, wherein the reflector comprises a mirror or reflective surface.

4. The integrated optical component of claim 1, wherein the angle is greater than 90° and up to 135°.

5. The integrated optical component of claim 1, wherein the angle is 90°.

6. The integrated optical component of claim 1, wherein the angle is less than 90°.

7. An aerosol sensing system comprising:
a detection area comprising a sampling space;
a light source configured to project light to at least a portion of a holder, wherein the portion of the holder comprises the detection area;
an integrated optical component comprising:
a first lens configured on a first plane and disposed on a first sidewall of the integrated optical component, wherein the first lens is configured to receive incident light from the detection area and focus the incident light onto a reflector through a medium;
the reflector configured on a third plane and disposed on a third sidewall of the integrated optical component, wherein the reflector is configured to reflect the incident light towards a second lens; and
the second lens configured on a second plane and disposed on a second sidewall of the integrated optical component, wherein the second lens is configured to receive the incident light from the reflector and focus the incident light to a photosensor, wherein the third plane is opposite an angle formed by an intersection of the first plane and the second plane;
the integrated optical component coupled to a circuit board via the holder, wherein
(i) the holder comprises a fixture that positions the integrated optical component in a stationary position relative to the light source and the photosensor, and
(ii) the integrated optical component is configured to:
receive the incident light from the detection area based at least in part on the light projected by the light source; and
direct the incident light to the photosensor;
the photosensor configured to:
receive the incident projected light from the integrated optical component; and
convert the incident projected light into an electric signal; and
a shield configured to protect the photosensor, the circuit board, and the light source from damage.

8. The aerosol sensing system of claim 7, wherein the electric signal is representative of characteristics of the incident light.

9. The aerosol sensing system of claim 7, wherein the electric signal is usable by a processor of a computing device or a circuit to detect aerosols in the detection area based at least in part on the incident light.

10. The aerosol sensing system of claim 7, wherein the light source comprises a semiconductor light emitter.

11. The aerosol sensing system of claim 10, wherein the semiconductor light emitter comprises at least one of: a light emitting diode, or a semiconductor laser diode.

12. The aerosol sensing system of claim 7, wherein the photosensor comprises an optical sensitive device.

13. The aerosol sensing system of claim 12, wherein the optical sensitive device comprises at least one of: a photodiode, a photo integrated circuit diode, a phototransistor, a photomultiplier tube, or a phototriode.

14. The aerosol sensing system of claim 7, wherein the photosensor is further configured to generate electric signals associated with a number of particles, particle size, and particle concentration.

15. The aerosol sensing system of claim 7, wherein the integrated optical component comprises the first lens facing the detection area, the first lens configured to:
receive the incident light from the detection area; and
focus the incident light onto the reflector.

16. The aerosol sensing system of claim 7, wherein the integrated optical component comprises the second lens positioned about the photosensor, the second lens configured to:
receive the incident light from the reflector; and
focus the incident light to the photosensor.

17. The aerosol sensing system of claim 7, wherein the integrated optical component comprises:
a housing; and
a plurality of apertures on given sidewalls of the housing.

18. An aerosol sensor comprising:
a circuit board configured to generate aerosol detection signals based at least in part on electric signals generated by a photosensor;
an integrated optical component coupled to the circuit board via a holder, the integrated optical component comprising:
a first lens configured on a first plane and disposed on a first sidewall of the integrated optical component, wherein the first lens is configured to receive incident light from a detection area and focus the incident light onto a reflector through a medium;
the reflector configured on a third plane and disposed on a third sidewall of the integrated optical component, wherein the reflector is configured to reflect the incident light towards a second lens; and
the second lens configured on a second plane and disposed on a second sidewall of the integrated optical component, wherein the second lens is configured to receive the incident light from the reflector and focus the incident light to the photosensor, wherein the third plane is opposite an angle formed by an intersection of the first plane and the second plane;
the holder comprising a fixture that positions the integrated optical component in a stationary position relative to a light source and the photosensor;
the light source coupled to the circuit board and interfacing with the first sidewall of the integrated optical component, wherein:
(i) the light source is configured to (a) project light to at least a portion of the holder and, (b) cause the projected light to be received into the integrated optical component at the first sidewall, and
(ii) the portion of the holder comprises the detection area;
the photosensor coupled to the circuit board and interfacing with the second sidewall of the integrated optical component, wherein the photosensor is configured to;
(i) receive the projected light from the integrated optical component via the second sidewall, and
(ii) convert the projected light into the electric signals; and
a shield configured to protect the photosensor, the circuit board, and the light source from damage.

* * * * *